# (12) United States Patent
Otsuka (10) Patent No.: US 10,913,402 B2
(45) Date of Patent: Feb. 9, 2021

(54) INTERIOR COMPONENT AND INTERIOR COMPONENT MANUFACTURING METHOD

(71) Applicant: KASAI KOGYO CO., LTD., Kanagawa (JP)

(72) Inventor: Hiroshi Otsuka, Chigasaki (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 29 days.

(21) Appl. No.: 16/345,776

(22) PCT Filed: May 30, 2017

(86) PCT No.: PCT/JP2017/020139
§ 371 (c)(1),
(2) Date: Apr. 29, 2019

(87) PCT Pub. No.: WO2018/220723
PCT Pub. Date: Dec. 6, 2018

(65) Prior Publication Data
US 2020/0055464 A1 Feb. 20, 2020

(51) Int. Cl.
*B60R 13/02* (2006.01)
*F16B 5/06* (2006.01)
*F16B 21/08* (2006.01)

(52) U.S. Cl.
CPC ...... *B60R 13/0237* (2013.01); *B60R 13/0206* (2013.01); *F16B 5/06* (2013.01); *F16B 21/088* (2013.01)

(58) Field of Classification Search
CPC ............ B60R 13/0237; B60R 13/0206; B60R 13/0212; B60R 13/025; B60R 13/0256;
(Continued)

(56) References Cited

U.S. PATENT DOCUMENTS 3,550,217 A * 12/1970 Collyer .................. F16B 5/065
411/509
4,765,036 A * 8/1988 Iguchi ..................... B60R 13/04
24/289
(Continued)

FOREIGN PATENT DOCUMENTS

JP H04-041104 U 4/1992
JP H04-066408 U 6/1992
(Continued)

OTHER PUBLICATIONS

International Search Report for International Application No. PCT/JP2017/020139 dated Jul. 18, 2017, Japan, 2 pages.

*Primary Examiner* — Dennis H Pedder
(74) *Attorney, Agent, or Firm* — United IP Counselors, LLC (57) ABSTRACT

An interior component includes: an interior component body; and a mount structure for mounting the interior component body on a vehicle body. The mount structure includes: a leg part extending from the interior component body; a guide part provided at a tip of the leg part; a pair of elastic engaging hooks extending from the guide part toward the interior component body while being spaced apart from and opposing to each other; and a slit provided between the leg part and one of the elastic engaging hooks. An interval in a spaced-apart direction of the pair of elastic engaging hooks is equal to or greater than a dimension in the spaced-apart direction of the leg part. Hence, the slide molds are shifted in parallel to each other in the long-side direction of the interior component body to be removed. Thus, the mount structure is formed.

6 Claims, 10 Drawing Sheets

(58) Field of Classification Search
CPC . B60R 13/02; B60R 13/0262; B60R 13/0268; B60R 13/0243; F16B 5/06; F16B 21/088; F16B 21/086; F16B 21/08
USPC .......... 296/191, 1.08, 209; 24/292, 295, 297
See application file for complete search history.

(56) References Cited

U.S. PATENT DOCUMENTS

| | | | | |
|---|---|---|---|---|
| 6,575,681 | B2* | 6/2003 | Kojima | F16B 21/086 24/297 |
| 8,287,034 | B2* | 10/2012 | Smith | B60R 13/0206 296/191 |
| 2004/0061348 | A1* | 4/2004 | Takeda | B60R 13/04 296/1.08 |
| 2005/0034282 | A1* | 2/2005 | Kurily | F16B 21/084 24/297 |
| 2006/0214468 | A1* | 9/2006 | Cass | B60R 13/0206 296/146.16 |
| 2008/0066266 | A1* | 3/2008 | Scroggie | B60R 13/0206 24/297 |
| 2016/0288733 | A1* | 10/2016 | Akazawa | B60R 13/00 |
| 2017/0240121 | A1* | 8/2017 | Yon | B60R 13/0206 |

FOREIGN PATENT DOCUMENTS

| | | |
|---|---|---|
| JP | 2001-074008 A | 3/2001 |
| JP | 2005-126000 A | 5/2005 |
| JP | 2008-149975 A | 7/2008 |

\* cited by examiner

INTERIOR COMPONENT AND INTERIOR COMPONENT MANUFACTURING METHOD

CROSS-REFERENCE TO RELATED APPLICATIONS

This application is a National Stage Entry application of PCT International Application No. PCT/JP2017/020139, filed on May 30, 2017, the entire contents of which are hereby incorporated by reference.

BACKGROUND

1. Technical Field

The present invention relates to a vehicle interior component and a method of manufacturing the interior component.

2. Description of the Background

A conventional interior component such as a kick plate includes a mount structure, which includes an engaging hook for mounting the body of the interior component on a vehicle body such as a side sill panel (Japanese Unexamined Patent Application Publication 2005-126000).

In the mount structure of the conventional interior component, slits are respectively provided on both sides of the engaging hook, and the engaging hook partially projects outward while crossing the mold-removing direction. That is, there exists an undercut which cannot be formed through use of just two molds, namely, an inner mold and an outer mold.

In order to form the undercut, in addition to the inner mold and the outer mold, what is employed is a slide mold which is removable in the direction different from those in which the inner mold and the outer mold are removed.

In order to form the slits which open in an elastic deformation direction of the engaging hook respectively on both sides of the engaging hook, the direction of removing the slide mold is set to be identical to the elastic deformation direction of the engaging hook.

The slide mold is to be horizontally shifted in being removed. Therefore, absence of any obstructive part of the molded article on the route of the slide mold is prerequisite. Thus, conventionally, it has been necessary to exercise due caution in eliminating any obstructive part such as a flange around the periphery of the interior component body on the route of the slide mold. For example, the interior component body is designed by removing part of the flange; alternatively, the mount structure is disposed toward the center as much as possible relative to the interior component body.

Such limitations impair design flexibility for the interior component body, to compromise the stiffness of the interior component body itself. The limitations also impair flexibility in arranging the mount structure at the interior component body, to compromise the supporting stiffness of the interior component to the vehicle body.

BRIEF SUMMARY

The present invention has been made in view of the problem described above, and an object thereof is to provide an interior component with improved design flexibility and enhanced stiffness, and a method of manufacturing the interior component.

In order to achieve the object above, the present invention is configured as follows.

(1) An interior component of the present invention includes: an interior component body; and a mount structure for mounting the interior component body on a vehicle body. The mount structure includes: a leg part extending from the interior component body; a guide part provided at a tip of the leg part; a pair of elastic engaging hooks extending from the guide part toward the interior component body while being spaced apart from and opposing to each other; and a slit provided between the leg part and one of the elastic engaging hooks. An interval in a spaced-apart direction of the pair of elastic engaging hooks is equal to or greater than a dimension in a spaced-apart direction of the leg part.

(2) In the configuration (1), the spaced-apart direction is a short-side direction of the interior component body.

(3) In the configuration (1) or (2), the interval in the spaced-apart direction of the pair of elastic engaging hooks is equal to the dimension in the spaced-apart direction of the leg part.

(4) In any one of the configurations (1) to (3), the interior component body includes a plurality of the mount structures. The mount structure is arranged eccentrically on one side and other side with reference to a virtual center line along a long-side direction of the interior component body.

(5) In any one of the configurations (1) to (4), the interior component body includes a plurality of the mount structures. The mount structures are arranged so that a sum of an eccentricity amount on the one side with reference to the virtual center line along the long-side direction of the interior component body and a sum of an eccentricity amount on the other side are equal to each other.

(6) A method of manufacturing an interior component of the present invention is a method of manufacturing an interior component including a mount structure including a pair of elastic engaging hooks spaced apart from and opposing to each other, the method including: a slide mold installing step of installing a pair of slide molds for forming an outer shape of the mount structure; an inner mold installing step of installing an inner mold for forming an inner shape of the mount structure; an injecting step of injecting melted resin into a cavity formed between the pair of slide molds and the inner mold; and a releasing step of releasing the mount structure from the pair of slide molds and the inner mold. In the releasing step, the pair of slide molds are shifted in parallel to each other and in directions opposite to each other in a direction perpendicular to the spaced-apart direction.

The present invention provides an interior component with improved design flexibility and enhanced stiffness, and a method of manufacturing the interior component.

BRIEF DESCRIPTION OF DRAWINGS

FIGS. 8A to 8F are explanatory illustrations showing directions of removing slide molds, in which.

DETAILED DESCRIPTION

Embodiment

In the following, with reference to the drawings, a detailed description will be given of a mode for carrying out the present invention (hereinafter referred to as the embodiment). Unless otherwise specified, the vehicle outside, the cabin side, front, rear, right, left, above, and below refer to the directions with reference to a vehicle. The long-side direction of a kick plate 100 is X, the short-side direction of the kick plate 100 perpendicular to the long-side direction X is Y, and the top-bottom direction of the vehicle or the height direction of the kick plate 100 is Z (see FIG. 2).

In the following embodiment, while the description will be exemplarily given of a kick plate 100 (an interior component) mounted on a door side sill panel 200 (a vehicle body) of a vehicle, the present invention is not limited thereto. The present invention is applicable also to other interior component mounted on other part of a vehicle.

Figure 1:
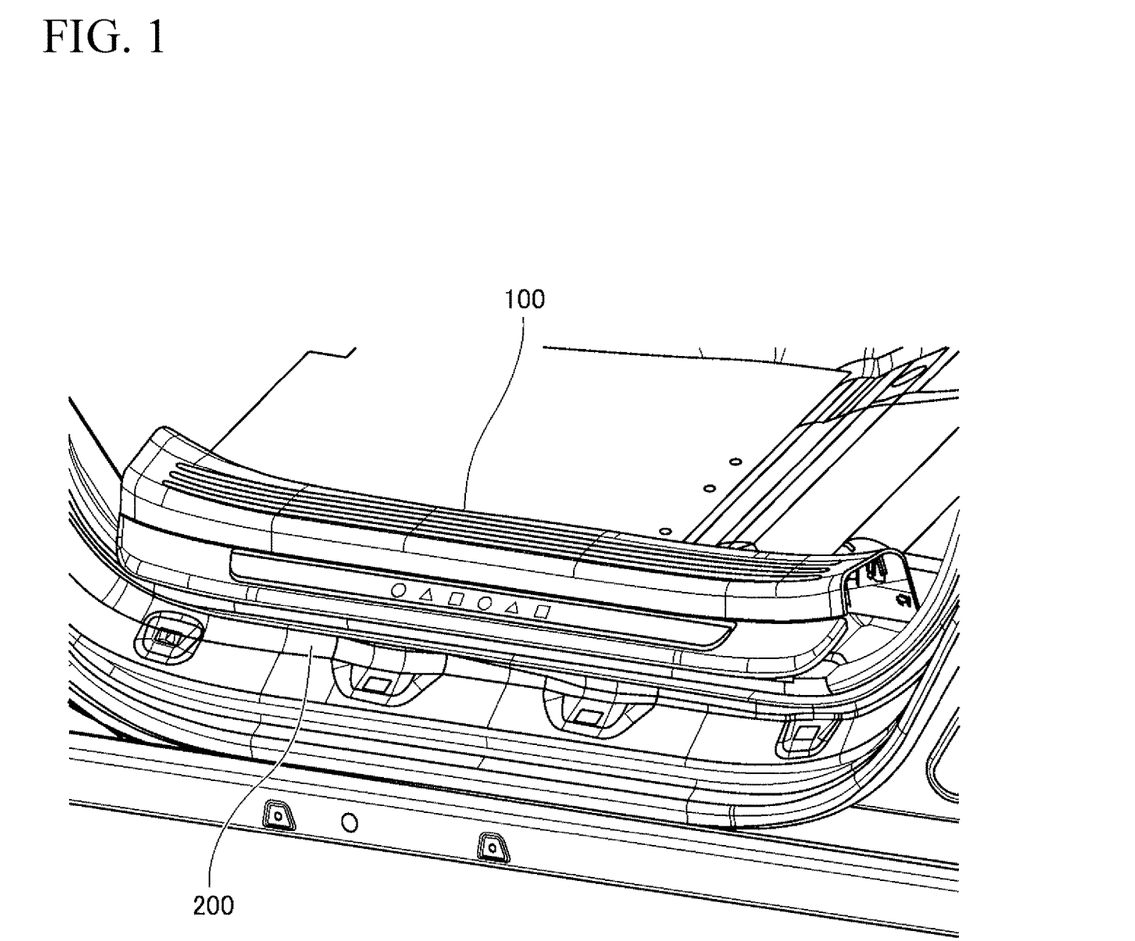
FIG. 1 is a perspective view of a kick plate (an interior component) mounted on a door side sill panel (a vehicle body) of a vehicle.
Figure 2:
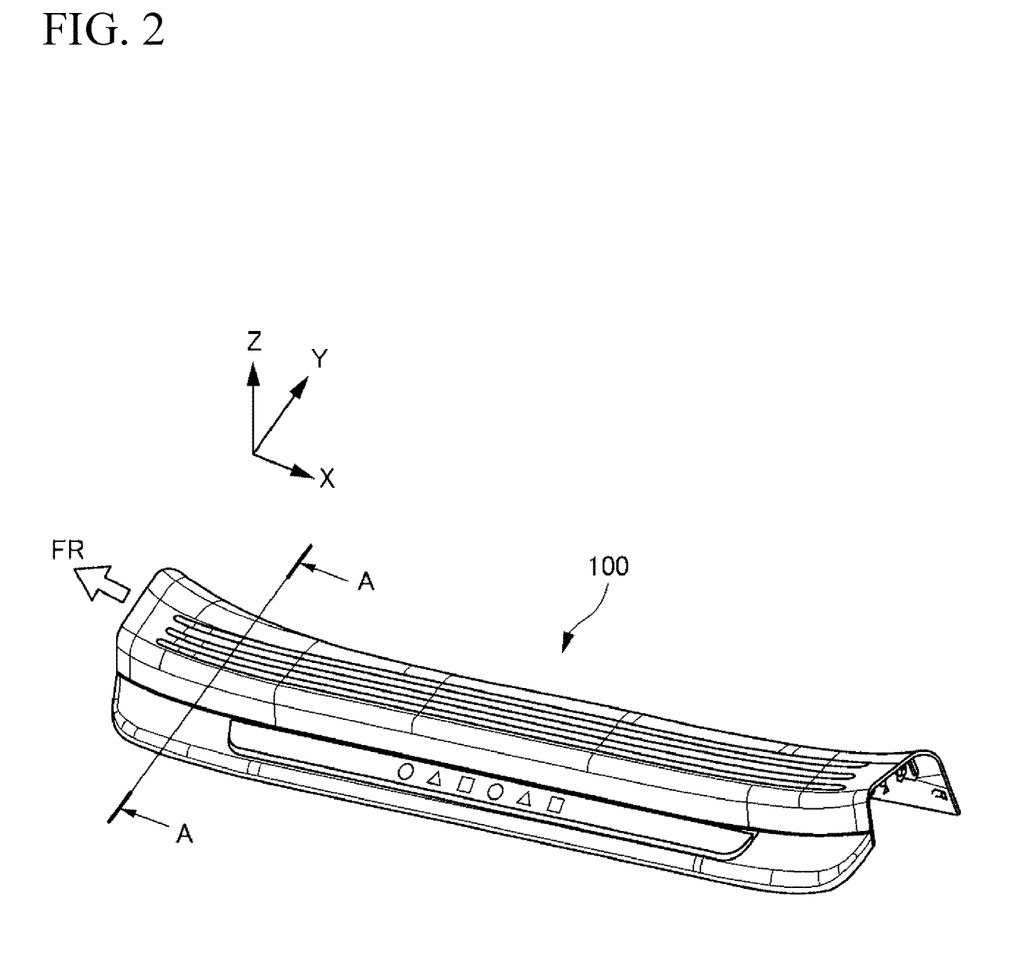
FIG. 2 is a perspective view of the kick plate.
Figure 3:
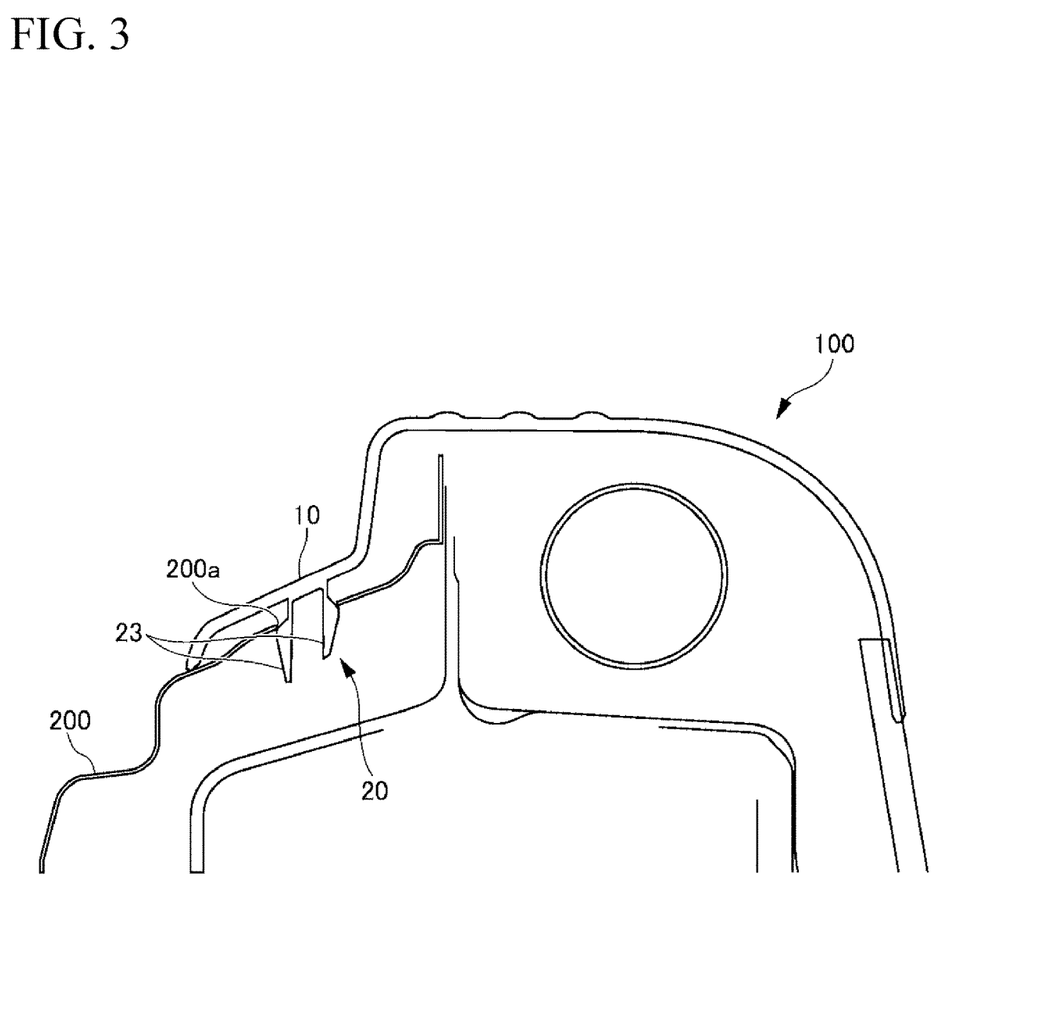
FIG. 3 is a detailed cross-sectional view taken along line A-A in FIG. 2.
Figure 4:
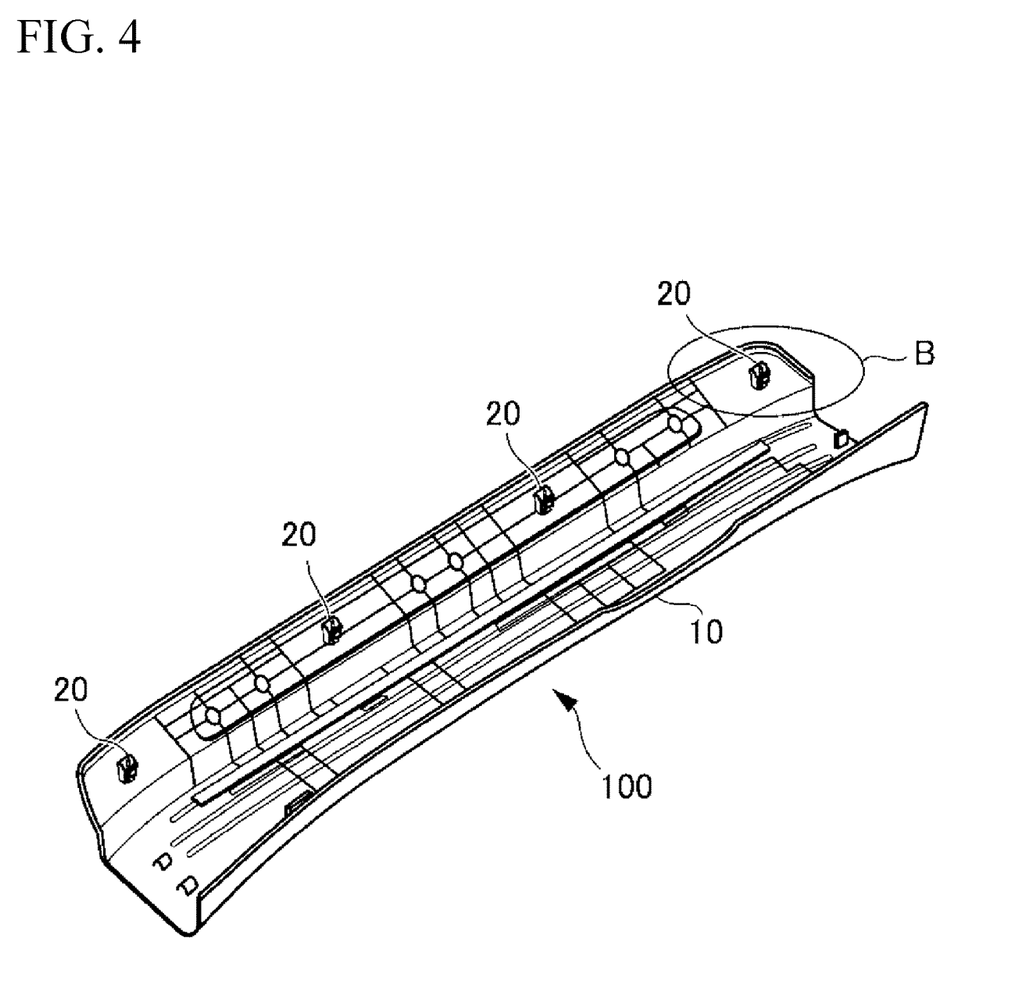
FIG. 4 is a perspective view of the kick plate inverted from the state shown in FIG. 2.
Figure 5:
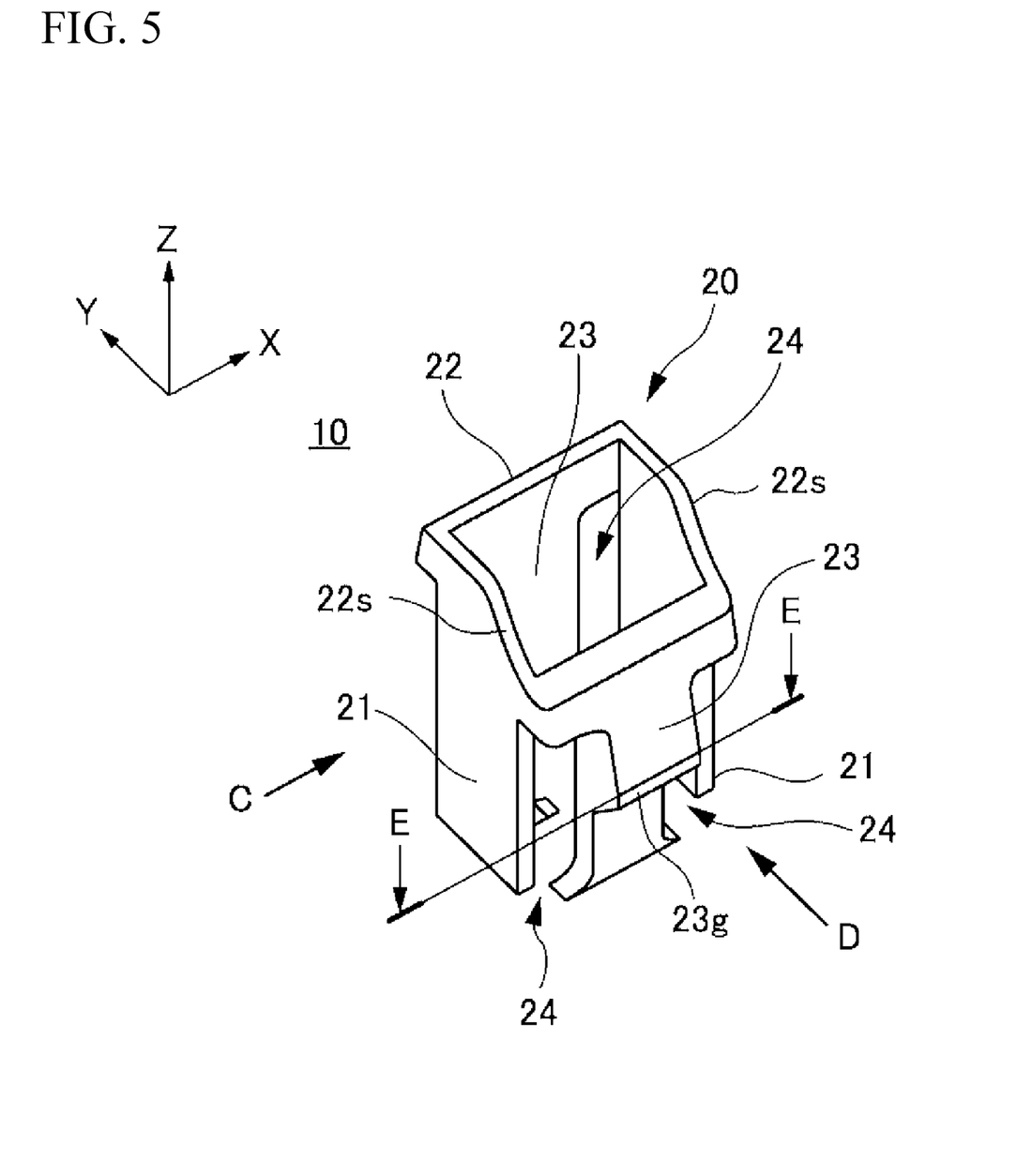
FIG. 5 is a detailed illustration of part B in FIG. 4.
Figure 6:
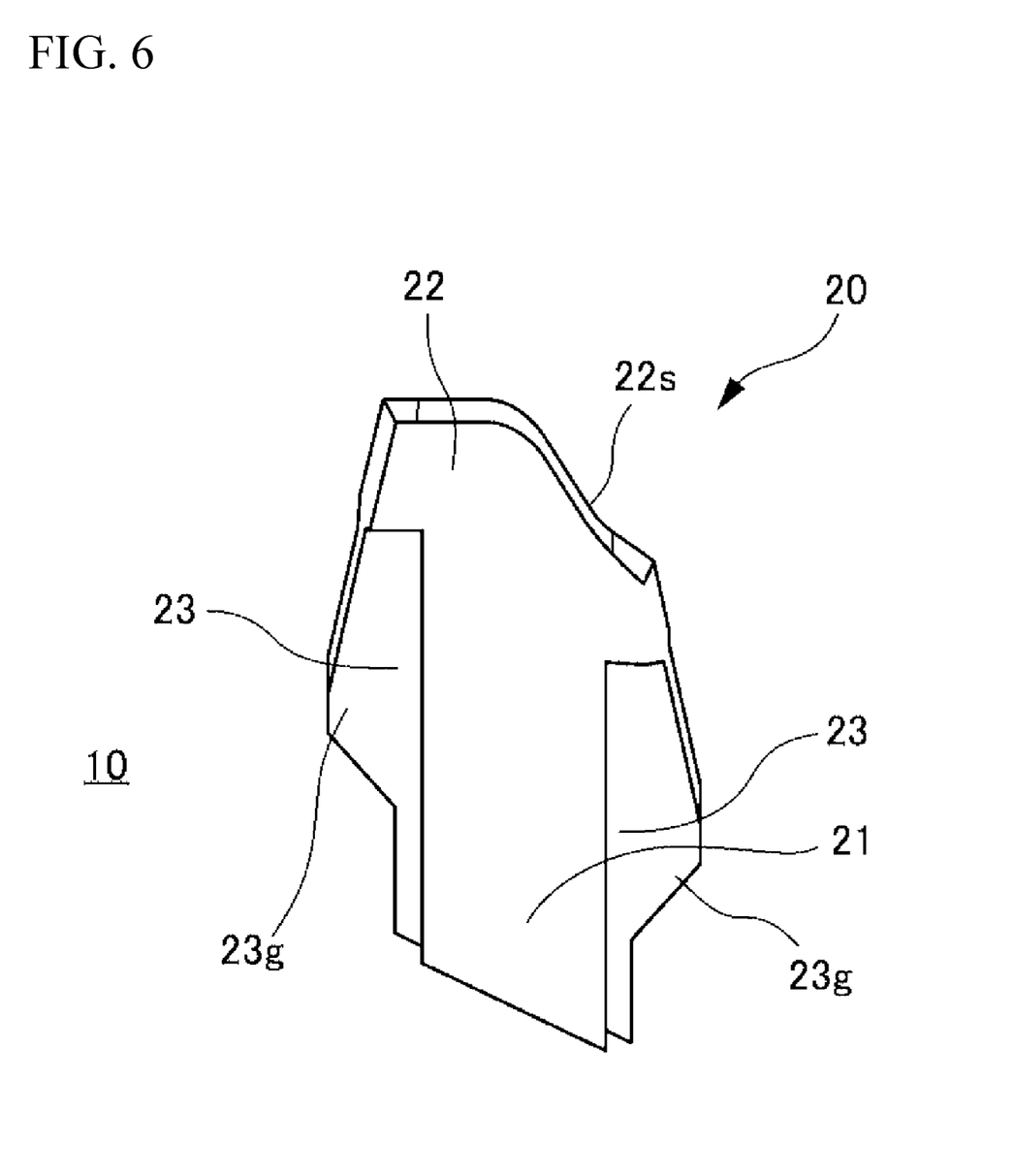
FIG. 6 is a view taken along arrow C in FIG. 5.
Figure 7:
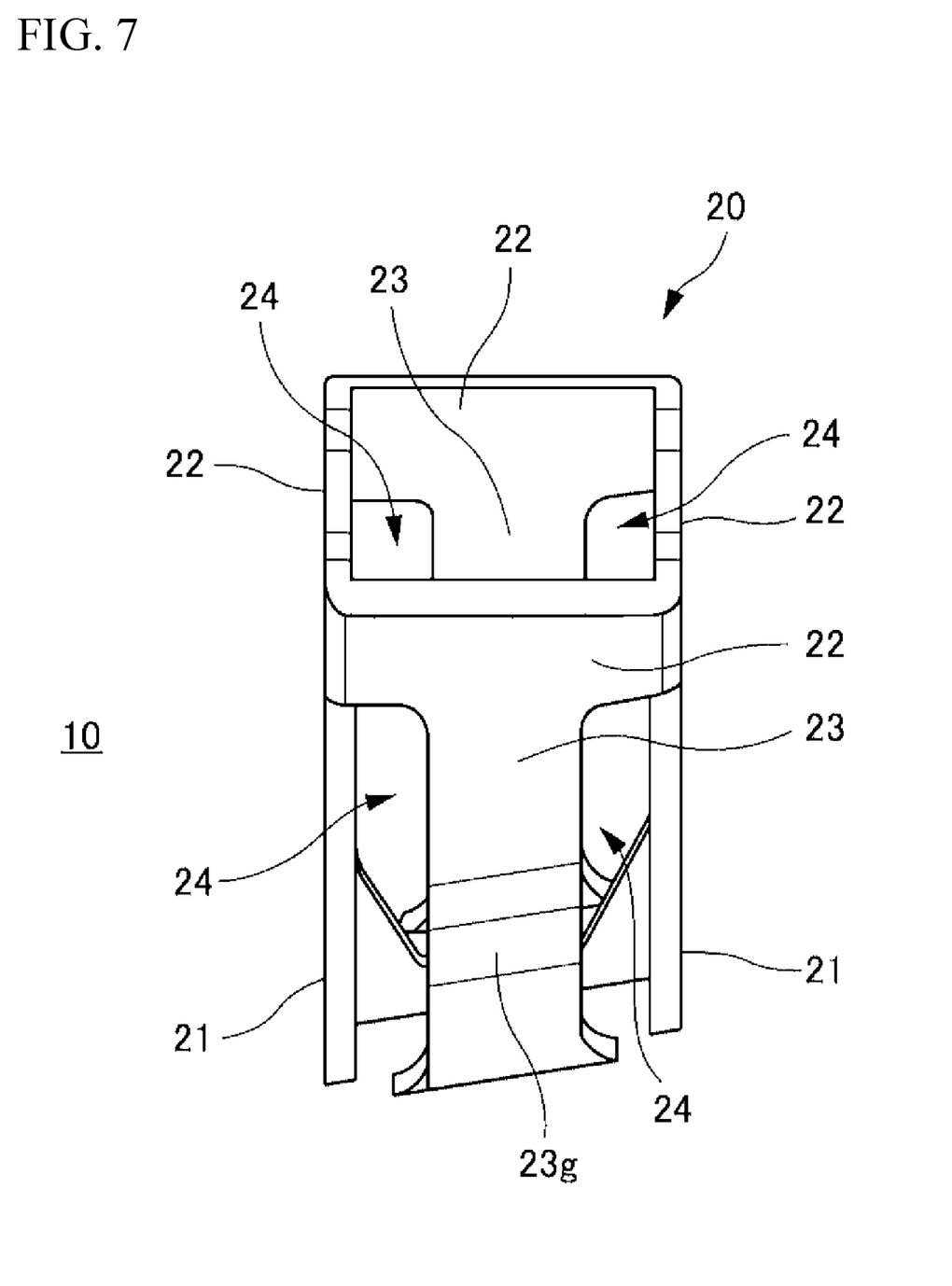
FIG. 7 is a view taken along arrow D in FIG. 5.
Figure 8A:
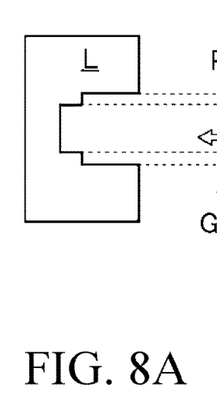
FIG. 8A is a cross-sectional view of one slide mold.
Figure 8B:
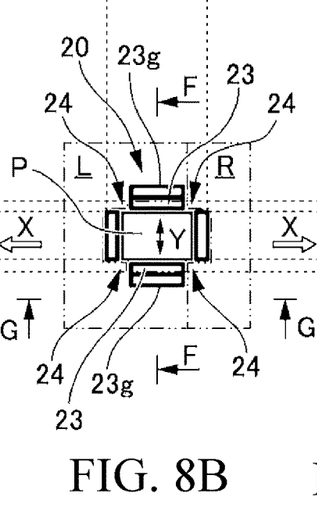
FIG. 8B is a cross-sectional view showing the relationship between the mount structure and the slide molds.
Figures 8C, 8D:
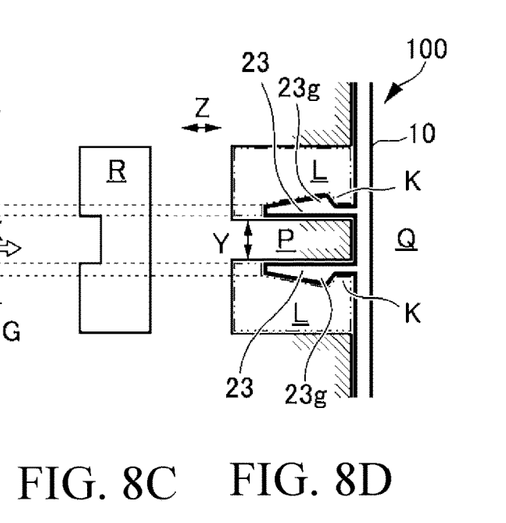
FIG. 8C is a cross-sectional view of other slide mold.
FIG. 8D is a cross-sectional view taken along line F-F in FIG. 8B.
Figure 8E:
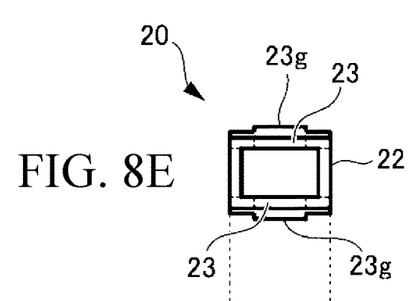
FIG. 8E is a plan view of the mount structure.
Figure 8F:
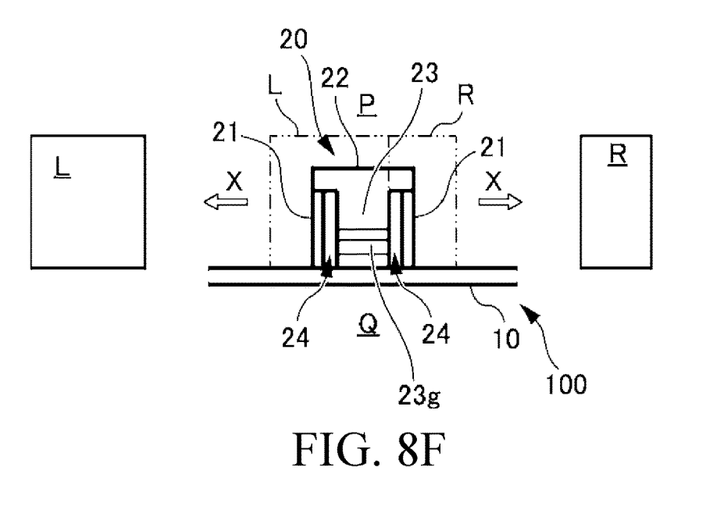
FIG. 8F is a front view of the mount structure.
Figure 9A:
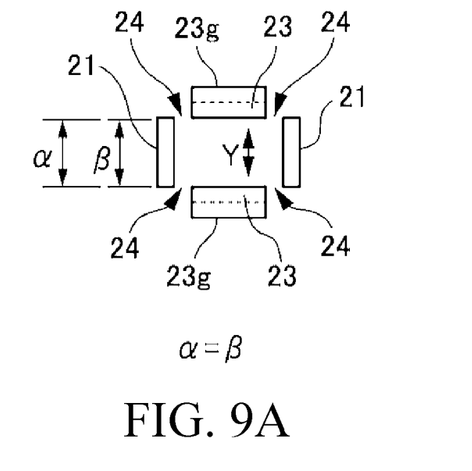
FIG. 9A is a cross-sectional view taken along line E-E in FIG. 5.
Figure 9B:
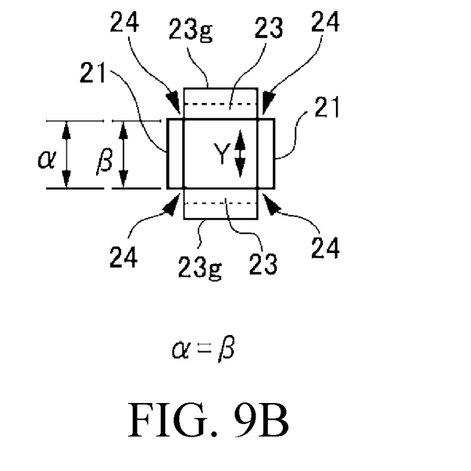
FIG. 9B is a cross-sectional view according to a first variation corresponding to the cross-sectional view taken along line E-E.
Figure 9C:
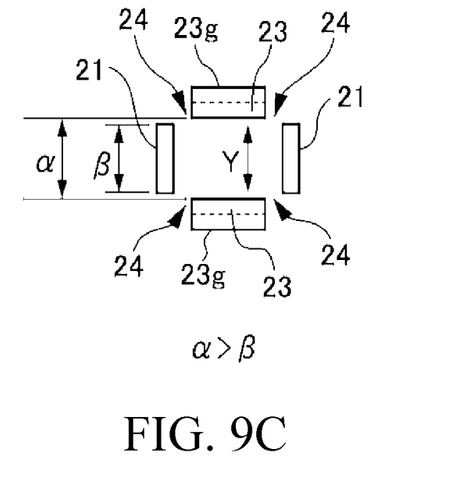
FIG. 9C is a cross-sectional view according to a second variation corresponding to the cross-sectional view taken along line E-E.
Figure 9D:
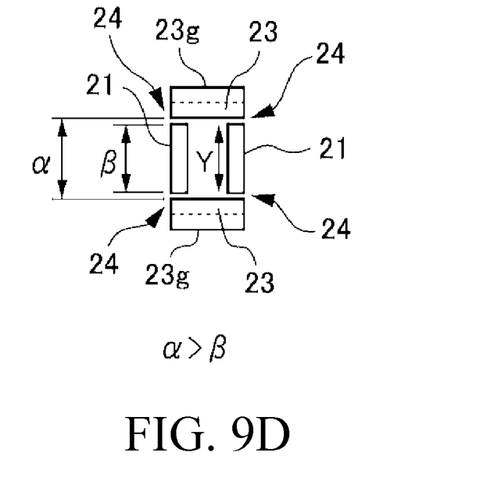
FIG. 9D is a cross-sectional view according to a third variation corresponding to the cross-sectional view taken along line E-E.

FIG. 1 is a perspective view of a kick plate 100 (an interior component) mounted on a door side sill panel 200 (a vehicle body) of a vehicle. FIG. 2 is a perspective view of the kick plate 100. FIG. 3 is a detailed cross-sectional view taken along line A-A in FIG. 2. FIG. 4 is a perspective view of the kick plate 100 inverted from the state shown in FIG. 2. FIG. 5 is a detailed illustration of part B in FIG. 4. FIG. 6 is a view taken along arrow C in FIG. 5. FIG. 7 is a view taken along arrow D in FIG. 5. FIGS. 8A to 8F are explanatory illustrations showing directions of removing slide molds L, R, in which: FIG. 8A is a cross-sectional view of one slide mold L; FIG. 8B is a cross-sectional view showing the relationship between a mount structure 20 and the slide molds L, R; FIG. 8C is a cross-sectional view of other slide mold R; FIG. 8D is a cross-sectional view taken along line F-F in FIG. 8B; FIG. 8E is a plan view of the mount structure 20; FIG. 8F is a front view of the mount structure 20. FIG. 9A is a cross-sectional view taken along line E-E in FIG. 5. FIG. 9B is a cross-sectional view according to a first variation corresponding to the cross-sectional view taken along line E-E. FIG. 9C is a cross-sectional view according to a second variation corresponding to the cross-sectional view taken along line E-E. FIG. 9D is a cross-sectional view according to a third variation corresponding to the cross-sectional view taken along line E-E.

As shown in FIGS. 1 to 4, a kick plate 100 (an interior component) is configured to be mounted on a door side sill panel 200 (a vehicle body) of a vehicle.

As shown in FIG. 4, the kick plate 100 includes an interior component body 10, and a mount structure 20 for mounting the interior component body 10 on the door side sill panel 200. In the present embodiment, the mount structure 20 is provided at each of four locations at the lower surface of the interior component body 10.

The kick plate 100 is a resin-made member formed by injection molding. The kick plate 100 is plate-like as a whole, and elongated along the shape of the door side sill panel 200.

The door side sill panel 200 includes an engaging hole 200a into which the mount structure 20 is inserted and engaged. The engaging hole 200a is a quadrangular hole whose size and shape correspond to the shape of the mount structure 20.

By the mount structure 20 being inserted into and engaged with the engaging hole 200a, the kick plate 100 is mounted on the door side sill panel 200.

As shown in FIG. 5, the mount structure 20 includes leg parts 21 extending from the interior component body 10, a guide part 22 provided at the tips of the leg parts 21, a pair of elastic engaging hooks 23 extending from the guide part 22 toward the interior component body 10 while being spaced apart from and opposing to each other, and slits 24 provided respectively between the leg parts 21 and the elastic engaging hooks 23.

The mount structure 20 is formed integrally with the interior component body 10. This secures strength between the interior component body 10 and the mount structure 20, ensuring volume production. The mount structure 20 may be formed as an element separate from the interior component body 10.

The leg parts 21 are formed integrally with the interior component body 10, and support the guide part 22 provided at the tip of the mount structure 20.

The leg parts 21 forming a pair are spaced apart from and oppose to each other. The leg parts 21 forming a pair respectively support two sides opposing to each other out of four sides forming the guide part 22 in a quadrangular shape.

The guide part 22 is quadrangular as a whole as seen in a plan view (see FIGS. 5, 7, 8E).

The guide part 22 includes an inclined part 22s (see FIGS. 5 and 6) at its tip. With the inclined part 22s, the guide part 22 smoothly guides the mount structure 20 to the engaging hole 200a.

The leg parts 21 respectively connect between the interior component body 10 and two opposing sides of the guide part 22 out of the four sides forming the quadrangular guide part 22. The other two opposing sides where the leg parts 21 are not formed are respectively provided with the elastic engaging hooks 23.

The elastic engaging hooks 23 are each provided between the slits 24 adjacent to each other, and plate-like as a whole. Each elastic engaging hook 23 includes, at its center, a bulging part 23g whose outer dimension is greater than the inner dimension of the engaging hole 200a. The bulging part 23g bulges outward.

The elastic engaging hooks 23 forming a pair are spaced apart from and oppose to each other. The elastic engaging hooks 23 extend from the guide part 22 toward the interior component body 10. The elastic engaging hooks 23 respectively connect between the interior component body 10 and two opposing sides of the guide part 22 where the leg parts 21 are not formed out of the four sides forming the quadrangular guide part 22. Here, the elastic engaging hooks 23 may not be directly coupled to the interior component body 10 and not supported between the interior component body 10 and the guide part 22. Instead, the elastic engaging hooks 23 may be cantilevered by the two opposing sides of the guide part 22 where the leg parts 21 are not formed out of the four sides of the quadrangular guide part 22.

The slits 24 are provided each between one of the leg parts 21 and one of the elastic engaging hooks 23. As shown in FIG. 9 and others, in the present embodiment, the mount structure 20 includes four slits 24.

The slits 24 facilitate elastic deformation of the elastic engaging hooks 23 each formed between adjacent ones of slits 24. Any adjustment on the length and width of the slits 24 will properly set the modulus of elasticity of the elastic engaging hooks 23 taking into consideration of ease of insertion as well as engagement of the elastic engaging hooks 23 relative to the engaging hole 200a.

In the mount structure 20 being inserted into and engaged with the engaging hole 200a, specifically, first, the guide part 22 is inserted into the engaging hole 200a. As the guide part 22 is continuously inserted, the pair of elastic engaging hooks 23 whose outer dimension is greater than the inner dimension of the engaging hole 200a elastically deforms by the reactive force of the engaging hole 200a, and gradually deforms inward. Subsequently, when the pair of elastic engaging hooks 23 passes through the engaging hole 200a, the elastic engaging hooks 23 deform outward by their elasticity and recover the original shape. When the shape is recovered, the outer dimension of the pair of elastic engaging hooks 23 becomes greater than the inner dimension of the engaging hole 200a, and thus the elastic engaging hooks 23 engage with the engaging hole 200a. In this manner, the mount structure 20 engages with the engaging hole 200a.

Next, with reference to FIG. 8, a description will be given of a method of releasing (manufacturing) the mount structure 20 of the kick plate 100 when formed by injection molding.

As shown in FIGS. 8B and 8D, in integrally molding the kick plate 100 including the mount structure 20 and the interior component body 10, first, what is formed is a cavity corresponding to the shape of the kick plate 100 and surrounded by an inner mold P and an outer mold Q opposing to each other in the top-bottom direction Z, and, additionally, a pair of slide molds L, R opposing to each other in the long-side direction X for forming the outer shape of the mount structure 20.

Specifically, the pair of slide molds L, R for forming the outer shape of the mount structure 20 is installed (a slide mold installing step).

Next, the inner mold P for forming the inner shape of the mount structure 20 is installed (an inner mold installing step).

Here, the inner mold P and the slide mold L are in contact with each other. Similarly, the inner mold P and the slide mold R are in contact with each other. The melted resin will not enter those portions in contact with each other. When the inner mold P, the outer mold Q, and the pair of slide molds L, R are removed, those portions in contact with each other leave the slits 24.

The reason why the pair of slide molds L, R is necessary in addition to the inner mold P and the outer mold Q in integrally molding the kick plate 100 is as follows. With just the inner mold P and the outer mold Q, recesses K (see FIG. 8D) between the bulging parts 23g of the elastic engaging hooks 23 and the interior component body 10, and the slits 24 between the guide part 22 and the interior component body 10 cannot be formed.

Next, after the melted resin to be the kick plate 100 is injected into the cavity formed between the pair of slide molds L, R and the inner mold P (an injecting step), this state is retained until the melted resin cures.

When the melted resin has cured, the inner mold P and the outer mold Q are shifted to be removed in the direction in which the inner mold P and the outer mold Q are separated from each other, that is, in the opposite directions in the top-bottom direction Z. The timing of removing the outer mold Q may be earlier or later than the timing of removing the pair of slide molds L, R.

Subsequently, the pair of slide molds L, R is shifted to be removed in the direction in which the slide mold L and the slide mold R are separated from each other, that is, shifted in parallel to each other in the opposite directions in the long-side direction X which is perpendicular to a spaced-apart direction Y.

Thus, the mount structure 20 is released from the pair of slide molds L, R and the inner mold P (a releasing step), to provide the kick plate 100 in which the interior component body 10 and the mount structure 20 are integrated with each other.

FIG. 9A is a cross-sectional view taken along line E-E in FIG. 5, showing just the cross section of the mount structure 20 in FIG. 8B. FIG. 9B is a cross-sectional view according to a first variation corresponding to the cross-sectional view taken along line E-E. FIG. 9C is a cross-sectional view according to a second variation corresponding to the cross-sectional view taken along line E-E. FIG. 9D is a cross-sectional view according to a third variation corresponding to the cross-sectional view taken along line E-E.

Here, as shown in FIG. 9A, an interval a in the spaced-apart direction Y of the pair of elastic engaging hooks 23 forming the mount structure 20 (the direction in which one elastic engaging hook 23 and other elastic engaging hook 23 oppose to each other) is equal to a dimension $\beta$ in the spaced-apart direction Y of each leg part 21. That is, $\alpha=\beta$ is established. In the first variation shown in FIG. 9B also, $\alpha=\beta$ is established.

Alternatively, as in the second variation shown in FIG. 9C and the third variation shown in FIG. 9D, $\alpha>\beta$ may be established.

That is, the interval a is equal to or greater than the dimension $\beta$ in the spaced-apart direction Y of each leg part 21 ($\alpha \geq \beta$). Thus, as shown in FIG. 8, the slits 24 and the recesses k can also be formed having the shift direction in removing the slide molds L, R set not to the spaced-apart direction Y but to the long-side direction X perpendicular to the spaced-apart direction Y.

The spaced-apart direction Y is the short-side direction of the interior component body 10 (see FIG. 2). In other words, the direction in which the pair of elastic engaging hooks 23 are spaced apart from each other (the spaced-apart direction Y in FIGS. 5 and 8) coincides with the short-side direction of the interior component body 10. Thus, despite the presence of any obstructive part projecting from the lower surface of the interior component body 10 such as a flange formed at the edge of the interior component body 10 within a range overlapping with the mount structure 20 in the spaced-apart direction Y of the mount structure 20, it is not necessary for the slide molds L, R to be slid and removed in the spaced-apart direction Y. Instead, the slide molds L, R are slid and removed in the long-side direction X without interfering with the obstructive part. This allows the mount structure 20 to be provided at the edge of the interior component body 10.

As shown in FIG. 4, the interior component body 10 includes a plurality of mount structures 20. For example, as shown in FIGS. 10A and 10B, the arrangement of the mount structures 20 can be set as appropriate.

Figure 10A:
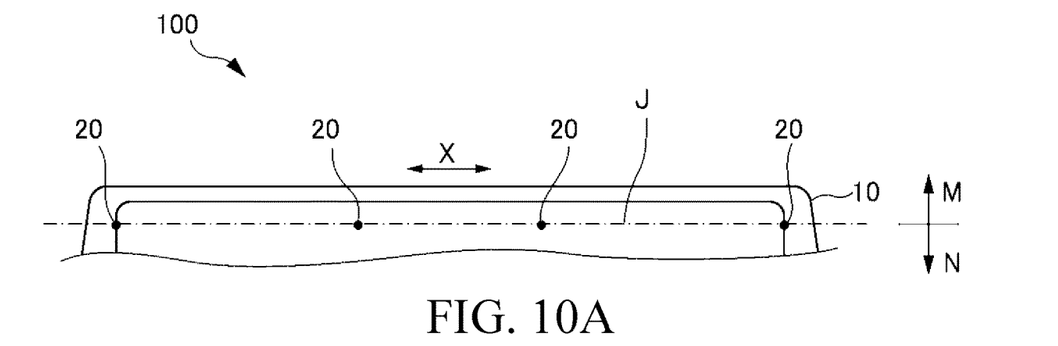
FIG. 10A is a bottom view of part of a kick plate in which mount structures are arranged on an identical virtual line.

FIG. 10A is a bottom view of part of the kick plate 100 in which the mount structures 20 are arranged on an identical virtual line. FIG. 10B is a bottom view of part of the kick plate 100 in which the mount structures 20 are arranged in a staggered manner. Note that, in FIGS. 10A and 10B, the mount structures 20 are schematically shown and each represented by a dot.

That is, as described above, each mount structure 20 is manufactured by the slide molds L, R being slid and removed in the long-side direction X. This improves flexibility in arranging the mount structures 20 at the interior component body 10 and, as shown in FIG. 10B, the mount structures 20 can be arranged eccentrically on one side M and other side N with reference to a straight virtual center line J along the long-side direction X of the interior component body 10. Thus, in particular, as shown in FIG. 10A, as compared to the kick plate 100 in which the mount structures 20 are arranged on an identical virtual line, the combined force of the plurality of mount structures 20 enhances the stiffness to the rotational distortion about the long-side direction X, and enhances the supporting stiffness of the kick plate 100 to the door side sill panel 200 (the vehicle body).

Figure 10B:
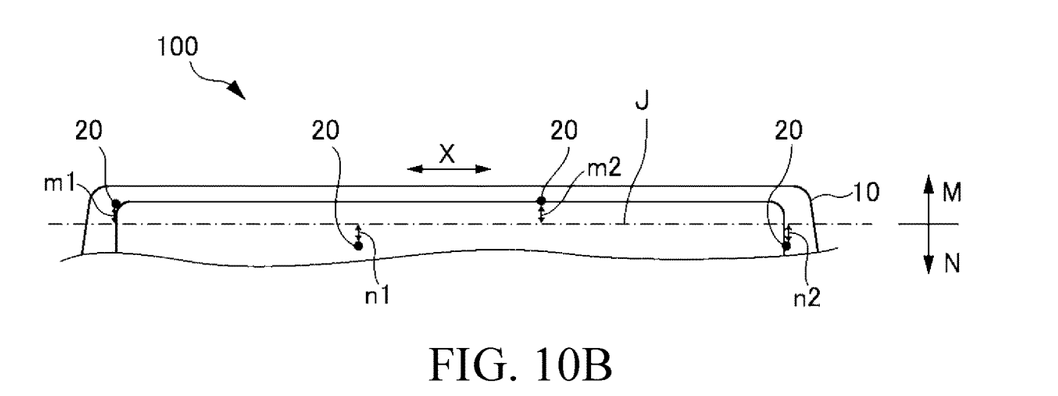
FIG. 10B is a bottom view of part of a kick plate in which mount structures are arranged in a staggered manner.

Furthermore, as shown in FIG. 10B, the mount structures 20 may be arranged in a staggered manner. Preferably, the mount structures 20 are arranged so that the sum $\Sigma m$ ($=m1+m2$) of the eccentricity amount m eccentric on the one side M with reference to the virtual center line J along the long-side direction X of the interior component body 10 and the sum $\Sigma n$ ($n1+n2$) of the eccentricity amount n eccentric on the other side N are equal to each other. This enhances the supporting stiffness of the kick plate 100 to the door side sill panel 200 (the vehicle body) in a balanced manner as a whole without local concentration.

The foregoing is the detailed description of the preferred embodiment of the present invention. The kick plate 100 according to the present invention is not limited to the above-described embodiment, and various modifications and changes may be made within the spirit of the present invention recited in the claims.

In the present invention, the kick plate 100 includes the interior component body 10 and the mount structure 20 for mounting the interior component body 10 on the door side sill panel 200 (the vehicle body). The mount structure 20 includes the leg parts 21 extending from the interior component body 10, the guide part 22 provided at the tips of the leg parts 21, the pair of elastic engaging hooks 23 extending from the guide part 22 toward the interior component body 10 while being spaced apart from and opposing to each other, and the slits 24 provided respectively between the leg parts 21 and the elastic engaging hooks 23. The interval a in the spaced-apart direction Y of the pair of elastic engaging hooks 23 is equal to or greater than the dimension β in the spaced-apart direction Y of the leg parts 21. The slide molds L, R are shifted in parallel to each other and removed in the long-side direction X of the interior component body 10, to form the mount structure 20. Hence, design flexibility for the interior component body 10 improves and the stiffness of the interior component body 10 itself enhances. Additionally, flexibility in arranging the mount structures 20 at the interior component body 10 improves, contributing to enhancing the supporting stiffness of the kick plate 100 to the door side sill panel 200 (the vehicle body).

REFERENCE SIGNS LIST

10 interior component body
100: kick plate (interior component)
20: mount structure
200: door side sill panel
200a: engaging hole
21: leg part
22: guide part
22s: inclined part
23: elastic engaging hook
23g: bulging part
24: slit
α: interval in spaced-apart direction of elastic engaging hooks
β: dimension in spaced-apart direction of leg parts
J: virtual center line
L: slide mold
M: one side with reference to virtual center line along long-side direction
N: other side with reference to virtual center line along long-side direction
P: inner mold
Q: outer mold
R: slide mold
X: long-side direction
Y: spaced-apart direction
Z: top-bottom direction
m: eccentricity amount
n: eccentricity amount

The invention claimed is:
1. An interior component comprising:
an interior component body; and
a mount structure for mounting the interior component body on a vehicle body, wherein
the mount structure includes
 a leg part integrally extending from the interior component body,
 a quadrangular guide part provided at a tip of the leg part,
 a pair of elastic engaging hooks extending from the guide part toward the interior component body integrally, the pair of elastic engaging hooks spaced apart from and opposing to each other, and
 a slit provided between the leg part and one of the elastic engaging hooks, and
a distance between the elastic engaging hooks in a spaced-apart direction of the pair of elastic engaging hooks is equal to or greater than a width in a spaced-apart direction of the leg part,
the interior component body includes a plurality of the mount structures, and
the mount structure is arranged eccentrically on one side and other side with reference to a virtual center line along a long-side direction of the interior component body, the long-side direction extending along a long side of the interior component body.
2. The interior component according to claim 1, wherein the spaced-apart direction of the pair of elastic engaging hooks is aligned with a short-side direction of the interior component body, the short-side direction extending along a short side of the interior component body.

3. An interior component comprising:

an interior component body; and a mount structure for mounting the interior component body on a vehicle body, wherein the mount structure includes
- a leg part integrally extending from the interior component body,
- a quadrangular guide part provided at a tip of the leg part,
- a pair of elastic engaging hooks extending from the guide part toward the interior component body integrally, the pair of elastic engaging hooks spaced apart from and opposing to each other, and
- a slit provided between the leg part and one of the elastic engaging hooks, and a distance between the elastic engaging hooks in a spaced-apart direction of the pair of elastic engaging hooks is equal to or greater than a width in a spaced-apart direction of the leg part, the interior component body includes a plurality of the mount structures, and the mount structures are arranged so that a sum of an eccentricity amount of the mount structures on the one side with reference to a virtual center line along a long-side direction of the interior component body and a sum of an eccentricity amount of the mount structures on the other side are equal to each other, the long-side direction extending along a long side of the interior component body.

4. The interior component according to claim 3, wherein the spaced-apart direction of the pair of elastic engaging hooks is aligned with a short-side direction of the interior component body, the short-side direction extending along a short side of the interior component body.

5. The interior component according to claim 1, wherein the interior component is a kick plate.

6. The interior component according to claim 3, wherein the interior component is a kick plate.

* * * * *